(12) United States Patent
Gandhi et al.

(10) Patent No.: US 9,567,233 B2
(45) Date of Patent: Feb. 14, 2017

(54) PROCESS FOR PREPARATION OF SYNTHETIC HYDROTALCITE FROM INDUSTRIAL WASTE

(71) Applicant: COUNCIL OF SCIENTIFIC & INDUSTRIAL RESEARCH, New Delhi (IN)

(72) Inventors: Maheshkumar Ramniklal Gandhi, Bhavnagar Gujarat (IN); Jatin Rameshchandra Chunawala, Bhavnagar Gujarat (IN); Satish Hariray Mehta, Bhavnagar Gujarat (IN)

(73) Assignee: Council of Scientific & Industrial Research, New Delhi (IN)

( * ) Notice: Subject to any disclaimer, the term of this patent is extended or adjusted under 35 U.S.C. 154(b) by 156 days.

(21) Appl. No.: 14/424,727

(22) PCT Filed: Sep. 2, 2013

(86) PCT No.: PCT/IN2013/000536
§ 371 (c)(1),
(2) Date: Feb. 27, 2015

(87) PCT Pub. No.: WO2014/033760
PCT Pub. Date: Mar. 6, 2014

(65) Prior Publication Data
US 2015/0218009 A1    Aug. 6, 2015

(30) Foreign Application Priority Data

Sep. 2, 2012 (IN) .......................... 0603/DEL/2012

(51) Int. Cl.
| | |
|---|---|
| *C01F 7/00* | (2006.01) |
| *C02F 1/28* | (2006.01) |
| *C02F 101/12* | (2006.01) |

(52) U.S. Cl.
CPC ............ *C01F 7/005* (2013.01); *C01P 2004/62* (2013.01); *C01P 2006/12* (2013.01); *C01P 2006/80* (2013.01); *C02F 1/281* (2013.01); *C02F 2101/12* (2013.01); *Y02W 10/37* (2015.05)

(58) Field of Classification Search
None
See application file for complete search history.

(56) References Cited

U.S. PATENT DOCUMENTS

| | | |
|---|---|---|
| 7,022,302 B2 | 4/2006 | Oza |
| 2001/0028870 A1 | 10/2001 | Takenaka |

FOREIGN PATENT DOCUMENTS

EP    0989095 A1    3/2000

OTHER PUBLICATIONS

International Search Report and Written Opinion from PCT/IN2013/000536 mailed Jan. 27, 2014 (7 pages).

*Primary Examiner* — Melissa Swain
(74) *Attorney, Agent, or Firm* — Colin P. Cahoon; Shaukat A. Karjeker; Carstens & Cahoon, LLP

(57) ABSTRACT

Development of a novel process for preparation of synthetic hydrotalcite using three industrial wastes such as aluminum chloride waste-generated in any of reaction where anhydrous aluminum chloride is used as Leawis acid catalyst such as Freidel Craft reaction, bittern containing magnesium compounds generated in solar salt work using brines such as sea brine and subsoil brines containing magnesium, and ammonium carbonate solution generated in organic pigment industries such as producing copper pthalo cyanin green. The process involves preparation of aluminum precursor and removing metallic impurities present in Aluminum hydroxide prepared from aluminum chloride containing waste, preparation of magnesium precursor, mixing the precursors, hydrothermally treating the mixture and adding surface modifying agents followed by filtration and drying.

7 Claims, No Drawings

PROCESS FOR PREPARATION OF SYNTHETIC HYDROTALCITE FROM INDUSTRIAL WASTE

The following specification particularly describes the invention and the manner in which it is to be performed.

FIELD OF THE INVENTION

The present invention relates to a process for preparation of synthetic hydrotalcite using industrial waste. Particularly, the present invention relates to development of a process for preparation of synthetic hydrotalcite from three industrial wastes such as aluminium chloride waste-generated in any of reaction where anhydrous aluminium chloride is used as Lewis acid catalyst such as Freidel Craft reaction, bittern containing magnesium compounds generated in solar salt work using brines such as sea brine and subsoil brines containing magnesium, and ammonium carbonate solution generated in organic pigment industries such as producing copper pthalo cyanin green. The applications of hydrotalcite include (i) as antacid (ii) as halogen scavenger (iii) base or support catalysts, (iv) adsorbent for wastewater treatment, (v) as stabilizer in poly-vinyl chloride and (vi) as fire retardant.

BACKGROUND OF THE INVENTION

Zikmund M. et al. in Czech Patent No. 277548 B6 disclose preparation of hydrotalcite by reaction of (i) an aqueous solution of an aluminate of alkaline metal with (ii) solid magnesium compounds viz barrigtonite ($MgCO_3.2H_2O$), nesquehonite ($MgCO_3.3H_2O$), lansfordite ($MgCO_3.3.5H_2O$) hydromagnesite ($Mg_5(CO_3)_4(OH)_2$ $4H_2O$) etc., for preparing an intermediate amorphous product which is kept mixed for 4 hrs prior to crystallisation for a period of 5-48 hrs at 50-120° C. Surface area (BET $N_2$) was 29 $m^2/gm$ and 18 $m^2/gm$ for product crystallized at 115° C. for 8 hrs and at 100° C. for 14 hrs respectively. Average agglomerate particle size of product was <1.0 µm. Drawbacks associated with the process are longer aging time of 4 hrs to get an amorphous intermediate and longer crystallisation time of 14 hrs at 100° C. for product having surface area of (BET $N_2$)<20 $m^2/gm$. Further, the product is made using purer compounds of aluminium and magnesium and did not achieve the desired specification for lower particle size.

Reichle W. T. in an article "Catalytic reactions by thermally activated synthetic anionic clay minerals" in J. Catalysis 94, 547 (1985) discloses the preparation of hydrotalcite by standard aqueous precipitation and heat crystallisation procedure which imbibe the intercalation of solution of magnesium nitrate, aluminium nitrate, with solution of caustic soda and sodium carbonate. Interaction was completed within 4 hrs with vigorous agitation at temperature below 35° C. A product having surface area (BET $N_2$) and particle size of <20 $m^2/gm$ and 1-2 µm respectively was obtained by heat crystallisation at 200° C. for 18 hrs. Drawbacks associated with the above process are longer addition and crystallization time as well as higher temperature under autogeneous pressure. Use of nitrate compounds of magnesium and aluminium is costly and at the same time creates disposal problem of ecologically unsafe waste containing nitrate anions.

Preston B. W. in U.S. Pat. No. 5,250,279 describes a process for production of synthetic hydrotalcite by reacting a mixture of magnesium hydroxide, a carbonate source, aluminium trihydrate of average particle size of 2.4 µm, or alkali metal aluminate, under hydrothermal condition at a temperature of 160-200° C. A product having purity of 99% and average particle size at ≤2 µm was obtained by using aluminate solution of low alkali content and molar ratio of magnesium source to bicarbonate in the range of 0.9-1.1. It is disclosed that at temperature below 160° C. the reaction proceeds very slowly and further that at temperature above 200° C. the product is of inferior quality. Drawbacks of the process are: (i) higher temperature of crystallisation (160-200° C.), (ii) critical control of molar ratio of reactant during synthesis. Low ratio of magnesium to bicarbonate results into product containing undesirable dawsonite as an impurity, (iii) sodium aluminate with ratio ($Na_2O/Al_2O_3$) higher than 1.25, results in excess sodium difficult to wash. Moreover, higher ratio gives impurities of dawsonite in hydrotalcite, (iv) use of magnesium hydroxide, a source of magnesium, required longer filtration time, and high consumption of water to make it free from adhering electrolyte, and (v) stringent control of average particle size (<2 µm) of aluminium trihydrate.

Oza et al in U.S. Pat. No. 7,022,302 describe a process for preparation of synthetic hydrotalcite by reacting precursors of aluminium and magnesium at high temperature in presence of suitable alkali carbonate. The aluminium is taken from soluble aluminium salts such as non ferric aluminium sulphate. Further, there is no practical attempt of utilization of the effluent generated in the reaction. Even though the bittern originated from sea water is used as magnesium source, the other reactants used were of commercial grade. The process involved more unit operations to prepare magnesium carbonate and convert it into hydroxide by digesting in alkali.

Objects of the Invention

The main object of the present invention is to provide a process for the preparation of hydrotalcite using three industrial waste streams such as aluminium chloride containing waste generated in organic industries such as one in copper pthalocyanin green, bittern—the mother liquor left after separation of salt—that contains magnesium, and ammonium carbonate containing stream generated in organic pigment industries such as copper pthalocyanin green.

Another object of the present invention is to prepare hydrotalcite using aluminium hydroxide prepared from the waste streams containing aluminium chloride.

Another object of the present invention is to remove all metallic impurity in the aluminium chloride waste stream prior to its utilization for synthesis of hydrotalcite.

Another object of the present invention is to use bittern as source of magnesium in preparation of hydrotalcite.

Another object of the present invention is to use ammonium carbonate containing waste stream to produce aluminium hydroxide and magnesium carbonate from aluminium chloride containing waste and bittern.

Yet another object of the present invention is to minimize the waste generation in synthetic hydrotalcite preparation through recycling the filtrate containing alkalis back into the process.

Another object of the present invention is to prepare aluminium containing precursor in its amphoteric state.

Yet another object of the present invention is to prepare magnesium carbonate-magnesium hydroxide mixture using bittern and recycle stream from the synthesis of hydrotalcite.

Yet another object of invention is to provide less energy intensive synthesis conditions that yield hydrophobic hydrotalcite having surface area (BET $N_2$) of ≤15 $m^2$/gm, average particle size of ≤0.5 μm at least 90% (by volume) particles are under 1 μm and free from amorphous as well as crystalline impurities as judged from IR and XRD.

SUMMARY OF INVENTION

Accordingly, the present invention provides a process for preparation of hydrotalcite using industrial waste, wherein the said process comprising the steps of:

(A) Preparing Magnesium Precursor
  (i) diluting bittern with water to obtain a solution with 2-2.5% (w/v) magnesium ion concentration and clarifying the diluted bittern by treating with amounts of alum solution and caustic soda solution to precipitate aluminium and magnesium hydroxide in the range of 75-100 ppm and 200-300 ppm respectively;
  (ii) separating the settled hydroxides as obtained in step (i) and obtaining a clear solution of bittern with a magnesium ion concentration ranging between 2-2.5% (w/v);
  (iii) treating clear bittern as obtained in step (ii) with alkali carbonate selected from waste ammonium carbonate generated in pigment industries or recycled stream from step (xiv) while keeping mole ratio of carbonate ions to magnesium ions in the range of 1.1-1.4 at ambient temperature ranging between 25-40° C. for a period ranging between 30-60 minutes to obtain an aqueous slurry of a magnesium precursor;
  (iv) filtering the magnesium precursors as obtained in steps (iii) in the form of cake, and washing the cakes till washed liquor of magnesium precursor shows less than 0.1% (w/v) of chloride and sulphate respectively;
  (v) slurrying magnesium precursor into water, homogenizing the same and heating it up to 45° C.;

(B) Preparing Aluminium Precursor
  (vi) reacting solution of aluminium chloride with treated ammonium carbonate waste or recycle stream comprising sodium carbonate to prepare aluminium hydroxide;
  (vii) filtering aluminium hydoxide from slurry in step (vi) and washing with water to remove chloride impurities less than 0.1% (w/v);
  (viii) reacting wet cake of aluminium hydroxide prepared in step (vii) with alkali to produce sodium aluminate under continuous stirring at temperature ranging between 30-60° C. keeping 1.25 mole of $Na_2O/Al_2O_3$ ions and additional alkali equivalent to Mg ions to be added as Magnesium carbonate to convert them all into Magnesium hydroxide;
  (ix) filtering the aluminium precursor prepared in (viii) above to remove all the insoluble metallic hydroxide and organic matter present in aluminum hydroxide prepared in step (vii);

(C) Obtaining Hydrotalcite
  (x) mixing two precursors prepared in step (v) and (ix) to obtain mixed slurry of 3-5% (w/v) (on product basis) and stirring it at ambient temperature ranging between 35-45° C. for a period ranging between 3 to 4 hrs;
  (xi) heating the aged slurry in step (x) at temperature ranging between 140-150° C. for a period ranging between 4 to 5 hours in auto clave;
  (xii) cooling the slurry in step (xi) to temperature ranging between 70° C.-90° C., adding stearic acid of 4 to 4.5% (w/w on product basis) to a slurry with continuous stirring at temperature ranging between 70-90° C. for a period ranging between 15-25 min.;
  (xiii) agitating the slurry obtained in step (xii) while allowing to cool to temperature ranging between 45-50° C., filtering the slurry and washing the cake till filtrate indicated pH of 8.5 to 10.0; wherein said filtrate comprises sodium carbonate having concentration in the range of 4-4.5% (w/v);
  (xiv) recycling the filtrate to step (iii) to prepare magnesium precursor or step (vi) to prepare aluminium hydroxide;
  (xv) drying the said wet cake as obtained in step (xiv) at temperature ranging between 100-110° C., pulverizing and sieving it to pass through 150-250 BSS mesh to obtain hydrophobic hydrotalcite in powder form;
said steps (A) and (B) runs parallel or sequentially In one embodiment of the present invention the bittern used in step (i) is selected from sea bittern or subsoil brine concentrate containing magnesium ions in the range of 1.3-4.2 molar.

In an embodiment of the present invention the bittern is having a density in the range of 29-36° Baume.

In another embodiment of the present invention the bittern has a composition comprising of NaCl 20-2%, $MgCl_2$ 8-35%, $MgSO_4$ 5-7%, and KCl 0.5-4.5% (w/v).

In still another embodiment of the present invention Aluminium chloride used in step (vi) is from the waste stream containing aluminium chloride generated in the organic synthesis using anhydrous aluminium chloride as catalyst.

In still another embodiment of the present invention the hydrotalcite prepared exhibits surface area (BET $N_2$) of product activated at 200° C. for 1 hr ≤15 $m^2$/gm, average particle size (by volume) of around ≤0.5 μm, at least 90% particles are under 1 μm, and free from amorphous as well as crystalline impurities as judged from IR and XRD.

In still another embodiment of the present invention yield of hydrotalcite is in the range of 83-93% based on Mg added.

DETAILED DESCRIPTION OF THE INVENTION

The present invention provides a process for the preparation of hydrotalcite which comprises:

(A) Preparing Magnesium Precursor
  (i) diluting bittern with water to obtain a solution with about 2% (w/v) magnesium ion concentration and clarifying the diluted bittern by treating with equivalent amounts of alum solution and caustic soda solution to precipitate aluminium and magnesium hydroxide in the range of 75-100 ppm and 200-300 ppm respectively;
  (ii) Separating the settled hydroxides and obtaining a clear solution of bittern with a magnesium ion concentration around 2% (w/v);
  (iii) reacting clear bittern obtained in step (ii) above with alkali carbonate such as treated waste ammonium carbonate generated in pigment industries or recycled stream from step (xiv) while keeping mole ratio of carbonate ions to magnesium ions in the range of 1.1-1.4 at ambient temperature to obtain an aqueous slurry of a magnesium precursor;
  (iv) filtering the magnesium precursors obtained in steps (iii) above in the form of cake, and washing the cakes till washed liquor of magnesium precursor shows less than 0.1% (w/v) of chloride and sulphate;
  (v) slurrying magnesium precursor into water, homogenizing the same and heating it up to 45° C.;

(B) Preparing Aluminium Precursor
  (vi) Reacting solution of aluminium chloride with treated ammonium carbonate waste or recycle stream comprising sodium carbonate to prepare aluminium hydroxide;
  (vii) Filtering the solids from slurry in step (vi) and washing with water to remove chloride impurities;
  (viii) reacting wet cake of aluminium hydroxide prepared in step (vii) with alkali to produce sodium aluminate under continuous stirring keeping 1.25 mole of $Na_2O/Al_2O_3$ ions and 2 mol equivalent to Mg ions as present in magnesium precursor prepared in step (v);
  (ix) filtering the aluminium precursor prepared in (viii) above to remove all the insoluble metallic hydroxide and organic matter present in aluminium hydroxide prepared in step (vii);
(C) Obtaining Hydrotalcite
  (x) mixing two precursors prepared in step (v) and (ix) to obtain mixed slurry of 3-5% (w/v) on product basis) and stirring it at ambient temperature for 3 hrs;
  (xi) heating the aged slurry in step (x) at 150° C. for 5 hours in auto clave;
  (xii) cooling the slurry after step (xi) to 85° C., adding stearic acid of 4.5% (w/w on product basis) to slurry with continuous stirring;
  (xiii) agitating the slurry obtained in step (xii) while allowing to cool to 50° C., filtering the slurry and washing the cake till filtrate indicated pH of 8.5 to 10.0; wherein said filtrate comprises sodium carbonate having concentration in the range of 4-4.5% (w/v)
  (xiv) recycling the filtrate to step (iii) to prepare magnesium precursor or step (vi) to prepare aluminium hydroxide;
  (xv) drying the said wet cake, pulverizing and sieving it to pass through 150 BSS mesh to obtain hydrophobic hydrotalcite in powder form;
  said steps (A) and (B) runs parallel or sequentially;

The hydrotalcite prepared exhibits surface area (BET $N_2$) of product activated at 200° C. for 1 hr ≤15 $m^2$/gm, average particle size (by volume) of around ≤0.5 μm, at least 90% particles are under 1 μm, and free from amorphous as well as crystalline impurities as judged from IR and XRD.

The hydrotalcite is characterized by (i) powder x-ray diffraction in the range of 5-70° 2θ with Cu Kα radiation, exhibits six major diffraction bands at around 7.76, 3.89, 2.59, 2.30, 1.53 and 1.50 A° (ii) IR spectrophotometer in the range of 4000-400 $cm^{-1}$ using KBr pellet technique, (iii) surface area by BET ($N_2$-adsorption) of 150° C., 1 hr activate sample, (iv) particle size (vol. %) by laser diffraction method of a wet slurry. Product (25 mg) is dispersed with 1 drop (ml) of Laboline (surface active agent, S D fine Chem). This well homogenized paste is mixed with 250 ml of 0.2 wt % aqueous solution of sodium hexametaphoaphate and dispersed with ultrasonic waves for 3 minutes before measuring particle size distribution. (Master size 2000 of malvern)

Synthatic hydrotalcite suitable for many applications especially as halogen scavenger and heat stabilizer in polymer should possess the following specifications:

| Properties | SHT (present invention) | International product specs |
|---|---|---|
| Molar ratio $MgO/Al_2O_3$ | 4.2 | 4.0-5.0 |
| Specific surface area (BET) $m^2$/gm | 8-9 | 5-15 |
| Loss on drying (105° C., 1 hr, % wt) | 0.4 | 0.5 max. |
| Heavy metals (as pb) | <30 ppm | 30 ppm max. |

-continued

| Properties | SHT (present invention) | International product specs |
|---|---|---|
| Particle size distribution | | |
| Mean particle size (surface weighted) | 0.45 | 0.4-0.7 |
| Under 1 μm: | 90% | 85% min. |
| 1-2 μm | None | 3.5% |
| Over 3 μm | None | None |
| pH of suspension | | |
| [2% (w/v) $C_2H_5OH:H_2O$ (1:1)] | 9.1 | 9.0 ± 0.5 |
| Bulk density gm/c.c | 0.3 | 0.33 (0.06 $m^3$/20 kg bag) |

As indicated above, minimum 85% particles should be less than 1 μm. By following conventional method, this is not being achieved.

In the present art, aluminium precursor is sodium aluminate prepared from aluminium containing waste stream. Aluminium hydroxycarbonate is prepared by reacting aluminium chloride containing waste stream which is filtered and washed. The solid cake of aluminium hydroxyl carbonate is reacted with sodium hydroxide to get sodium aluminate solution. All metallic impurities other than aluminium are precipitated as solid hydroxide. Sodium aluminate solution is filtered and the filtrate is purified sodium aluminate which is used as aluminium precursor.

As the present art employs waste streams like aluminium chloride waste, ammonium carbonate waste generated in dye industries, and bittern generated in solar salt industry, it has distinct economic advantage over the prior art.

In prior art, Aluminium hydroxide is prepared by reacting aluminium salt with alkali carbonate. This is second precursor. In present art, it is prepared by reacting with waste ammonium carbonate or recycled stream of alkali carbonate generated in the hydrothermal reaction. The aluminium hydroxide so produced is reacted with alkali to prepare sodium aluminate, which is aluminium precursor. The sodium aluminate in which aluminium is in solution form and all other trace impurities are in solid form such as ferric hydroxide. This is removed by filtration of the sodium alluminate so prepared. This precursor devoid of all the other metallic impurities will give the SHT of desired characteristics. An example is given wherein conventional route is followed and ended up with off specs product.

Following examples are given by way of illustration and therefore should not be construed to limit the scope of present invention:

Example 1

Comparative Example

The clarified bittern prepared in example 1 containing 26.22 mole of magnesium ions was treated for 45 minutes with a molar solution of sodium carbonate with continuous stirring keeping mole ratio of carbonate ions to magnesium ions at 1.15 at ambient temperature. It was further stirred for 15 minutes at ambient temperature, then filtered using vacuum nutsche filtration unit. The cake was washed till $Cl^{1-}$ and $SO_4^{2-}$ content of filtrate reached a value of around 0.1% (w/v). Wet cake was well dispersed in demineralized water using colloid mill to prepare 25 L slurry. The slurry was heated to 70° C. The quantity of caustic soda solution of 2N added in 15 minutes with continuous stirring was 0.95 equivalent of magnesium ions (25 L). 25 L water was added to the slurry so prepared to make up the volume of the slurry to 50 L.

Aluminium hydroxide precursor was prepared using 19 lit of waste effluent containing aluminium chloride generated in the production of Copper pthalocyanin organic pigment and exhibiting the following analysis.

$AlCl_3$ (8.15% $AlCl_3$, 1.65% $Al^{3+}$, 3.11% $Al_2O_3$). This solution was reacted with 25 L of 0.94 molar solution of $Na_2CO_3$. The mole ratio of $CO_3^{2-}/Al^{3+}$ was kept at 1.85. It was filtered using nutsche vacuum filter and washing the cake with water till $Cl^{1-}$ and other impurities are removed. Wet cake of aluminium precursor was well dispersed in demineralized water using colloidal mill to prepare 50 L slurry.

50 L slurry containing magnesium ions as prepared above was charged in an autoclave and then heated to 45° C. The 50 L slurry of aluminium precursor prepared as above was added to it.

The mixed slurry was slurry was aged for 3 hrs with mild stirring and then mixed slurry was heated up to 150° C. and corresponding pressure. The slurry was subjected to this condition for 5 hrs. The slurry was allowed to cool down to 80° C. and 133 gm of stearic acid was added. The slurry was further cooled under stirring till temperature of around 55° C. Surface modified product was then filtered and washed till free from adhering electrolytes. The end of washing is indicated by measurement of pH of the wash water to be 10. The cake was dried in tray dryer at 110° C. 2.7 kg of dry hydrotalcite product was obtained which was pulverized to pass through 150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.7 µm and 76% particles are under 1 µm. Surface area of product was 16 $m^2$/gm. The product does not meet the specification with respect to particle size and surface area.

The yield of product with respect to Magnesium added is 93%.

As discussed in detailed description, minimum 85% particles of SHT should be less than 1 µm particle size for the desired industrial applications. Therefore, the hydrotalcite prepared above using waste by following the process using Al and Mg precursors as disclosed in prior art (U.S. Pat. No. 7,022,302) does not meet the desired specification.

Example 2

The end bittern left after production of carnallite from the bittern left after separation of sodium chloride is carnallite end bittern. The carnallite end bittern with a density of 35° Baume having 11.2% $Mg^{2+}$, 0.15% $K^+$, 0.27% $Na^+$ 0.31% $SO_4^{2-}$, 0.26% $Ca^{2+}$, 32.28% $Cl^-$ (w/v) was diluted with water to get magnesium ions concentration of 2.2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling.

The clarified bittern containing 2.2% (w/v) magnesium ions is obtained.

The clarified bittern containing 29.25 mole of magnesium ions was treated for 45 minutes with a 34 L 1 molar solution of sodium carbonate with continuous stirring keeping mole ratio of carbonate ions to magnesium ions at 1.15 at ambient temperature of 35° C. It was further stirred for 15 minutes at the same ambient temperature, then filtered using single filtration unit and washing the cake were continued till $Cl^{1-}$ and $SO_4^{2-}$ content of filtrate of precursors reached a value of around 0.1% (w/v). Wet cake of magnesium precursor was well dispersed in demineralized water (DM) using colloid mill to prepare 50 L slurry containing magnesium ions.

Aluminium hydroxide precursor was prepared using 21.5 lit of waste effluent containing aluminium chloride generated in the production of Copper pthalocyanin organic pigment and exhibiting the following analysis.

$AlCl_3$ (8.15% $AlCl_3$, 1.65% $Al^{3+}$, 3.11% $Al_2O_3$). This solution was reacted with 28.5 L of 0.94 molar solution of $Na_2CO_3$. The mole ratio of $CO_3^{2-}/Al^{3+}$ was kept at 1.85. It was filtered using nutsche vacuum filter and washing the cake with water till $Cl^{1-}$ and other impurities are removed.

4.4 kg of wet cake of aluminum hydroxide (15% $Al_2O_3$) prepared as above using waste containing $AlCl_3$. 25 L of 3N NaOH solution previously heated to 50° C. was added to this aluminium hydroxide for dissolution of cake. DM water was added to make the volume 33 L. Quantity of this added alkali was determined to make mole ratio of $Na_2O/Al_2O_3$ of 1.25 and additional alkali equivalent to Mg ions to be added as Magnesium carbonate to convert them all into Magnesium hydroxide.

Aluminium precursor (33 L) was filtered to remove all the insoluble metallic hydroxide and organic matter present in aluminium hydroxide as it is prepared from waste $AlCl_3$.

50 L slurry containing magnesium ions as prepared above was charged in an autoclave then heated to 45° C.

33 L Sodium aluminate solution was added to this heated magnesium slurry in autoclave and slurry was aged for 3 hrs at temperature 45° C. with mild stirring and then mixed slurry was heated up to 150° C. and corresponding pressure and the slurry was subjected to this condition for 5 hrs. The slurry was allowed to cool down to 80° C. and stearic acid of 115 gms was added. The slurry was further cooled under stirring till temperature of 55° C. Surface modified product was then filtered and washed till free from adhering electrolytes. The end of washing is indicated by measurement of pH of the wash water to be 10. The cake was dried in tray dryer at 110° C. 2.66 kg of hydrotalcite product was obtained which was pulverized to pass through 150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.33 µm, 98% particles are under 1 µm. Surface area of product was 11 $m^2$/gm. The yield of product with respect to Magnesium added is 83%.

The hydrotalcite is characterized by (i) powder x-ray diffraction in the range of 5-70° 2θ with Cu K α radiation, (ii) IR spectrophotometer in the range of 4000-400 $cm^{-1}$ using KBr pellet technique, (iii) surface area by BET ($N_2$-adsorption) of 150° C., 1 hr activate sample, (iv) particle size (vol. %) by laser diffraction method of a wet slurry.

Example 3

The clarified bittern prepared in example 1 containing 58.67 mole of magnesium ions was treated for 45 minutes with a molar solution of sodium carbonate with continuous stirring keeping mole ratio of carbonate ions to magnesium ions at 1.15 at ambient temperature of 35° C. It was further stirred for 15 minutes at the same ambient temperature, then filtered using vacuum nutsche filtration unit. The cake was washed till $Cl^{1-}$ and $SO_4^{2-}$ content of filtrate reached a value of around 0.1% (w/v). Wet cake of magnesium precursor was well dispersed in demineralized water using colloid mill to prepare 80 L slurry containing magnesium.

8.25 kg of wet cake of aluminum hydroxide (15% $Al_2O_3$) prepared using waste containing $AlCl_3$ generated during production of copper phthalo cyanine green pigment was taken. 50 L of 2.97 N NaOH solution previously heated to 50° C. was added for dissolution of cake. DM water was added to make the volume 69 L. Quantity of this added alkali was determined to make mole ratio of $Na_2O/Al_2O_3$ of 1.25 and additional amount of alkali required to convert Mg ions to be added as Magnesium precursor into magnesium hydroxide.

Aluminium precursor was filtered to remove all the insoluble metallic hydroxide and organic matter present in aluminium hydroxide as it is prepared from waste $AlCl_3$.

80 L slurry containing magnesium ions as prepared above was charged in an autoclave and then heated to 45° C.

69 L Sodium aluminate solution was added to this heated magnesium precursor slurry in autoclave and slurry was aged for 3 hrs at 45° C. and then mixed slurry was heated up to 150° C. and corresponding pressure. The slurry was subjected to this condition for 5 hrs. The slurry was allowed to cool down to 80° C. and 250 gm of stearic acid was added. The slurry was further cooled under stirring till temperature of around 55° C. Surface modified product was then filtered (this filtrate can be recycled as source of sodium carbonate to prepare Mg and Al precursor) and washed till free from adhering electrolytes. The end of washing is indicated by measurement of pH of the wash water to be 10. The cake was dried in tray dryer at 110° C. 5.67 kg of hydrotalcite product was obtained which was pulverized to pass through 150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.31 µm, 99% particles are under 1 µm. Surface area of product was 8 m²/gm. The yield of the product based on Magnesium added works out to be 87%.

Example 4

The clarified bittern as prepared in Example 1 containing 58.67 mole of magnesium ions was taken in a vessel. 1 kg $Na_2CO_3$ was added into 105 L filtrate generated in Example 2 containing 0.41 M $Na_2CO_3$ and 0.24 M NaOH and stirred. This was added into the vessel in 45 minutes with continuous stirring keeping mole ratio of carbonate ions to magnesium ions at 1.15 at ambient temperature of 30° C. It was further stirred for 15 minutes at the same ambient temperature, then filtered using vacuum nutsche filtration unit. The cake was washed till $Cl^{1-}$ and $SO_4^{2-}$ content of filtrate of precursors reached a value of around 0.1% (w/v). Wet cake of magnesium precursor was well dispersed in demineralized water using colloidal mill to prepare 80 L slurry containing Magnesium carbonate and magnesium hydroxide.

8.25 kg of wet cake of aluminum hydroxide (15% $Al_2O_3$) prepared as described in Example-1 using waste containing $AlCl_3$ generated during production of copper phthalo cyanine green pigment was taken. 45 L of 2.8 N NaOH solution previously heated to 50° C. was added for dissolution of cake. DM water was added to make the volume 67 L. Quantity of this added alkali was determined to make mole ratio of $Na_2O/Al_2O_3$ of 1.25 and additional amount of alkali required to convert Mg ions added to this at later stage in form of magnesium precursor into magnesium hydroxide.

Aluminium precursor was filtered to remove all the insoluble metallic hydroxide and organic matter present in aluminium hydroxide as it is prepared from waste $AlCl_3$.

80 L slurry containing magnesium precursor as prepared above was charged in an autoclave and then heated to 45° C.

67 L Sodium aluminate solution was added to this heated magnesium precursor slurry in autoclave and slurry was aged for 3 hrs at 45° C. and then mixed slurry was heated up to 150° C. and corresponding pressure and the slurry was subjected to this condition for 5 hrs. The slurry was allowed to cool down to 80° C. and 250 gm of stearic acid was added. The slurry was further cooled under stirring till temperature of around 55° C. Surface modified product was then filtered and washed till free from adhering electrolytes. The end of washing is indicated by measurement of pH of the wash water to be 10. The cake was dried in tray dryer at 110° C. 5.4 kg of hydrotalcite product was obtained which was pulverized to pass through −150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.31 µm, 98% particles are under 1 µm. Surface area of product was 11 m²/gm. The yield of the product based on Magnesium added works out to be 83%.

Example 5

Bittern with a density of 29° Baume containing 20% NaCl, 8.4% $MgCl_2$, 5.4% $MgSO_4$ and 1.8% KCl (w/v) was diluted with water to get magnesium ions concentration of about 2.25% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide respectively. These precipitates were removed by settling.

The clarified bittern containing 2.2% (w/v) magnesium ions is obtained.

The clarified bittern containing 46.96 mole of magnesium ions was treated for 45 minutes with a 1 molar 54 L solution of $Na_2CO_3$ with continuous stirring at ambient temperature of 32° C. It was further stirred for 15 minutes at the same ambient temperature then filtered using single filtration unit and washing the cake were continued till $Cl^{1-}$ and $SO_4^{2-}$ content of filtrate of precursors reached a value of around 0.1% (w/v). Wet cake of magnesium precursor was well dispersed in demineralized water using colloid mill to prepare 50 L slurry containing magnesium precursor.

6.6 kg of wet cake of aluminum hydroxide (15% $Al_2O_3$) prepared as described in Example-1 using waste containing $AlCl_3$ generated during production of copper phthalo cyanine green pigment was taken to which 40 L of 2.97 N NaOH solution heated to 50° C. was added for dissolution and to make up 45 L the solution with DM water. The amount of alkali added to prepare the solution is determined to keep mole ratio of $Na_2O/Al_2O_3$ to be 1.25 and additional alkali equivalent to Mg ions to be added as Magnesium carbonate to convert them all into Magnesium hydroxide. Aluminium precursor so prepared was filtered to remove all the insoluble metallic hydroxide and organic matter present in aluminium hydroxide as it is prepared from waste $AlCl_3$.

50 L slurry containing magnesium precursor as prepared above was charged in an autoclave then heated to 45° C.

45 L Aluminium hydroxide precursor was added to magnesium precursor in autoclave and slurry was aged for 2.5 hrs at 45° C. and then mixed slurry was crystallized with stirring at 150° C. for 5 hrs. Ther slurry was cooled to 80° C. and 200 gm of stearic acid was added and stirred till temperature of around 55° C. Surface modified product was then filtered and washed till free from adhering electrolytes and filtrate indicated pH of 10. After drying wet cake at 110° C. in oven, 4.5 kg product product was obtained which was pulverized to pass through 150 BSS mesh was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.4 μm, 94% particles are under 1 μm. Surface area of product was 10 m²/gm. The yield of the product based on Magnesium added works out to be 87%.

Example 6

Bittern with a density of 29° Baume containing 20% NaCl, 8.4% $MgCl_2$, 5.4% $MgSO_4$ and 1.8% KCl (w/v) was diluted with water to get magnesium ions concentration of about 2.25% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling. The clarified bittern containing 2.2% (w/v) magnesium ions is obtained.

Waste effluent stream containing $(NH_4)_2CO_3$ (31.68% W/V) generated during production of copper phthalo cynine green pigment was diluted with water to get $(NH_4)_2CO_3$ concentration of about 9%.

The diluted $(NH_4)_2CO_3$ solution was treated with a solution of $MgCl_2\ 6H_2O$ containing 5.9% (w/v) $Mg^{+2}$ to precipitate 8260 ppm $MgCO_3$. These precipitates were removed by settling to get treated ammonium carbonate solution. The clarified stream containing 8.2% (w/v) ammonium carbonate is obtained.

The clarified bittern containing 56.67 mole of magnesium ions was treated for 45 minutes with 82 L of treated ammonium carbonate solution with continuous stirring at ambient temperature of 27° C. It was further stirred for 15 minutes at the same ambient temperature then filtered using single filtration unit and washing the cake were continued till $Cl^{1-}$ and $SO_4^{2-}$ content of filtrate reached a value of around 0.1% (w/v). Wet cake of magnesium precursor was well dispersed in demineralized water using colloid mill to prepare 70 L slurry containing magnesium precursor.

6.9 kg of wet cake of aluminum hydroxide (15% $Al_2O_3$) prepared as described in Example-1 using waste containing $AlCl_3$ generated during production of copper phthalo cyanine green pigment was taken and to it 27 L of 3 N NaOH solution previously heated to 50° C. was added for dissolution of cake. DM water was added to make the volume 60 L. Quantity of this added alkali was determined to make mole ratio of $Na_2O/Al_2O_3$ of 1.25. Aluminium precursor was filtered to remove all the insoluble metallic hydroxide and organic matter present in aluminium hydroxide as it is prepared from waste $AlCl_3$.

70 L slurry containing magnesium ions as prepared above was charged in an autoclave then heated to 45° C.

60 L aluminium precursor prepared as above was added to this heated magnesium precursor slurry in autoclave and slurry was aged for 3 hrs at 45° C. and then mixed slurry was heated up to 150° C. and corresponding pressure. The slurry was subjected to this condition for 5 hrs. The slurry was allowed to cool down to 80° C. and 207 gms of stearic acid was added. The slurry was further cooled under stirring till temperature of around 55° C. Surface modified product was then filtered and washed till free from adhering electrolytes. The end of washing is indicated by measurement of pH of the wash water to be 10. The cake was dried in tray dryer at 110° C. 5.2 kg of hydrotalcite product was obtained which was pulverized to pass through 150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.37 μm, 97% particles are under 1 μm. Surface area of product was 11 m²/gm. The yield of the product based on Magnesium added works out to be 83%.

Example 7

The clarified bittern as obtained in Example 6 containing 34.37 mole of magnesium ions was taken to which 40 L of 1 molar solution of sodium carbonate was added with continuous stirring in 45 minutes keeping mole ratio of carbonate ions to magnesium ions at 1.15 at ambient temperature. It was further stirred for 15 minutes at ambient temperature, then filtered using vacuum nutsche filtration unit. The cake was washed with water till $Cl^{1-}$ and $SO_4^{2-}$ content of filtrate reached a value of around 0.1% (w/v). Wet cake was well dispersed in demineralized water using colloid mill to prepare 25 L slurry containing magnesium precursor.

4.5 kg of wet cake of aluminum hydroxide (15% $Al_2O_3$) prepared as described in Example-1 using waste containing $AlCl_3$ generated during production of copper phthalo cyanine green pigment was taken to which 22 L of 4 N NaOH solution previously heated to 50° C. was added for dissolution. The solution so prepared is made up to 25 L by addition of DM water. Amount of this added alkali was determined considering to keep mole ratio of $Na_2O/Al_2O_3$ to be 1.25 and additional alkali equivalent to Mg ions to be added as Magnesium carbonate to convert them all into Magnesium hydroxide. Aluminium precursor so prepared was filtered to remove all the insoluble metallic hydroxide and organic matter present in aluminium hydroxide as it is prepared from waste $AlCl_3$ 25 L slurry containing magnesium precursor as prepared above was charged in an autoclave then heated to 45° C.

25 L Sodium aluminate solution was added to this heated magnesium precursor slurry in autoclave and slurry was aged for 3 hrs at 45° C. and then mixed slurry was heated up to 150° C. and corresponding pressure. The slurry was subjected to this condition for 5 hrs. The slurry was allowed to cool down to 80° C. and 148 gm of stearic acid was added. The slurry was further cooled under stirring till temperature of around 55° C. Surface modified product was then filtered and washed till free from adhering electrolytes. The end of washing is indicated by measurement of pH of the wash water to be 10. The cake was dried in tray dryer at 110° C. 3.3 kg of hydrotalcite product was obtained which was pulverized to pass through 150 BSS mesh. The product was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.38 μm, 97% particles are under 1 μm. Surface area of product was 9 m²/gm. The yield of the product based on Magnesium added works out to be 87%.

Example 8

The clarified bittern as obtained in Example 6 containing 5.23 mole of magnesium ions was taken to which 6.5. L of 1 molar solution of sodium carbonate was added with continuous stirring in 45 minutes keeping mole ratio of carbonate ions to magnesium ions at 1.15 at ambient temperature. It was further stirred for 15 minutes at ambient temperature, then filtered using vaccum nutsche filtration unit. The cake was washed with water till $Cl^-$ and $SO_4^{2-}$ content of filtrate reached a value of around 0.1% (w/v). Wet cake was well dispersed in demineralized water using colloid mill to prepare $L slurry containing magnesium precursor.

Aluminium hydroxide precursor was prepared using 3.8 lit of waste effluent containing aluminium chloride generated in the production of Copper pthalocyanin organic pigment and exhibiting the following analysis.

$AlCl_3$ (8.15% $AlCl_3$, 1.65% $Al^{3+}$, 3.11% $Al_2O_3$). This solution was reacted with 5 L solution of clarified stream containing 8.2% (w/v) ammonium carbonate as obtained in Example 6. The mole ratio of $CO_3^{2-}$ to $Al^{3+}$ was kept at 1.85. It was filtered using nutsche vacuum filter and washing the cake with water till $Cl^-$ impurities are removed.

0.68 kg of wet cake of aluminium hydroxide (15% $Al_2O_3$) was prepared as above using waste containing $AlCl_3$. 3.3 L of 3N NaOH solution previously heated to 50° C. was added to this aluminium hydroxide for dissolution of cake. DM water was ₂added to make the volume 4 L. Quantity of this added alkali was determined to make mole ratio of $Na_2O/Al_2O_3$ of 1.25 and additional alkali equivalent to Mg ions to be added as Magnesium Carbonate to convert them all into Magnesium hydroxide. Aluminium precursor (4 L) was filtered to remove all the insoluble metallic hydroxide and organic matter present in aluminium hydroxide as it is prepared from waste $AlCl_3$.

4 L slurry containing magnesium precursor as prepared as prepared above was charged in an autoclave the heated to 45° C.

4 L sodium aluminate solution was added to this heated magnesium precursor slurry in autoclave and slurry was aged for 3 hrs at 45° C. and then mixed slurry was heated up to 150° C. and corresponding pressure. The slurry was subjected to this condition for 5 hrs. The slurry was allowed to cool down to 80° C. and 25 grm of stearic acid was added. The slurry was further cooled under stirring till temperature of around 55° C. Surface modified product was then filtered and washed till free from adhering electrolytes. The end of washing is indicated by measurement of pH of the wash water to be 10. The cake was dried in tray dryer at 110° C. 0.51 kg of hydrotalcite product was obtained which was pulverized to pass through 150 BSS mesh. The product was characterized by XRD, IR and particle size. XRD pattern exhibited all the six major diffraction bands indicated absence crystalline impurities.

Similarly absence of amorphous impurities was indicated by IR spectrum. Average particle size (by volume) of product was 0.3 μm, 98% particles are under 1 μm. Surface area of product was 10 m²/gm. The yield of the product based on Magnesium added works out to be 89%.

Novel inventive steps along with advantages of the present invention are given below:—

The main inventive step of the present invention is to prepare hydrotalcite using three industrial waste streams such as aluminium chloride waste-generated in any of reaction where anhydrous aluminium chloride is used as Lewis acid catalyst such as Freidel Craft reaction, bittern containing magnesium compounds generated in solar salt work using brines such as sea brine and subsoil brines containing magnesium, and ammonium carbonate solution generated in organic pigment industries such as producing copper pthalo cyanin green and can be recycled to prepare Mg and Al precursors. The another inventive step is to prepare precursor in a manner such that the impurities are removed during the preparation of aluminium and magnesium precursors resulting in the product that is hydrophobic hydrotalcite having surface area (BET $N_2$) of ≤15 m²/gm, average particle size of ≤0.5 μm at least 90% (by volume) particles are under 1 μm and free from amorphous as well as crystalline impurities as judged from IR and XRD. The hydrotalcite with required properties cannot be prepared using waste by following the process by using Al and Mg precursors as disclosed in the U.S. Pat. No. 7,022,302 (as given in comparative example 1).

The invention claimed is:

1. A process for preparation of hydrotalcite using industrial waste, wherein the said process comprising the steps of:
   (A) preparing magnesium precursor
   (i) diluting bittern with water to obtain a solution with 2-2.5% (w/v) magnesium ion concentration and clarifying the diluted bittern by treating with amounts of alum solution and caustic soda solution to precipitate aluminium and magnesium hydroxide in the range of 75-100 ppm and 200-300 ppm respectively;
   (ii) separating the settled hydroxides as obtained in step (i) and obtaining a clear solution of bittern with a magnesium ion concentration ranging between 2-2.5% (w/v);
   (iii) treating clear bittern as obtained in step (ii) with alkali carbonate selected from waste ammonium carbonate generated in pigment industries or recycled stream from step (xiv) while keeping mole ratio of carbonate ions to magnesium ions in the range of 1.1-1.4 at ambient temperature ranging between 25-40° C. for a period ranging between 30-60 minutes to obtain an aqueous slurry of a magnesium precursor;
   (iv) filtering the magnesium precursors as obtained in steps (iii) in the form of cake, and washing the cakes till washed liquor of magnesium precursor shows less than 0.1% (w/v) of chloride and sulphate respectively;
   (v) slurrying magnesium precursor into water, homogenizing the same and heating it up to 45° C.;
   (B) preparing aluminium precursor
   (vi) reacting solution of aluminium chloride with treated ammonium carbonate waste or recycle stream comprising sodium carbonate to prepare aluminium hydroxide;
   (vii) filtering aluminium hydroxide from slurry in step (vi) and washing with water to remove chloride impurities less than 0.1% (w/v);
   (viii) reacting wet cake of aluminium hydroxide prepared in step (vii) with alkali to produce sodium aluminate under continuous stirring at temperature ranging between 30-60° C. keeping 1.25 mole of Na$_2$O/Al$_2$O$_3$ ions and additional alkali equivalent to Mg ions to be added as Magnesium carbonate to convert them all into Magnesium hydroxide;

(ix) filtering the aluminium precursor prepared in (viii) above to remove all the insoluble metallic hydroxide and organic matter present in aluminum hydroxide prepared in step (vii);

(x) mixing two precursors prepared in step (v) and (ix) to obtain mixed slurry of 3-5% (w/v) (on product basis) and stirring it at ambient temperature ranging between 35-45° C. for a period ranging between 3 to 4 hrs;

(xi) heating the aged slurry in step (x) at temperature ranging between 140-150° C. for a period ranging between 4 to 5 hours in auto clave;

(xii) cooling the slurry in step (xi) to temperature ranging between 70° C.-90° C., adding stearic acid of 4 to 4.5% (w/w on product basis) to a slurry with continuous stirring at temperature ranging between 70-90° C. for a period ranging between 15-25 min.;

(xiii) agitating the slurry obtained in step (xii) while allowing to cool to temperature ranging between 45-50° C., filtering the slurry and washing the cake till filtrate indicated pH of 8.5 to 10.0; wherein said filtrate comprises sodium carbonate having concentration in the range of 4-4.5% (w/v);

(xiv) recycling the filtrate to step (iii) to prepare magnesium precursor or step (vi) to prepare aluminium hydroxide;

(xv) drying the said wet cake as obtained in step (xiv) at temperature ranging between 100-110° C., pulverizing and sieving it to pass through 150-250 BSS mesh to obtain hydrophobic hydrotalcite in powder form;

said steps (A) and (B) runs parallel or sequentially.

2. A process as claimed in claim 1, wherein the bittern used in step (i) is selected from sea bittern or subsoil brine concentrate containing magnesium ions in the range of 1.3-4.2 molar.

3. A process as claimed in claim 1, wherein the bittern is having a density in the range of 29-36° Baume.

4. A process as claimed in claim 1, wherein the bittern has a composition comprising of NaCl 20-2%, MgCl$_2$ 8-35%, MgSO$_4$ 5-7%, and KCl 0.5-4.5% (w/v).

5. A process as claimed in claim 1, wherein Aluminium chloride used in step (vi) is from the waste stream containing aluminium chloride generated in the organic synthesis using anhydrous aluminium chloride as catalyst.

6. A process as claimed in claim 1, wherein the hydrotalcite prepared exhibits surface area (BET N$_2$) of product activated at 200° C. for 1 hr ≤15 m$^2$/gm, average particle size (by volume) of around ≤0.5 μm, at least 90% particles are under 1 μm, and free from amorphous as well as crystalline impurities as judged from IR and XRD.

7. A process as claimed in claim 1, wherein yield of hydrotalcite is in the range of 83-93% based on Mg added.

* * * * *